United States Patent
Zhan et al.

(10) Patent No.: US 10,396,335 B2
(45) Date of Patent: Aug. 27, 2019

(54) CONNECTOR FOR POWER BATTERIES, POWER BATTERY MODULE, POWER BATTERY PACK AND VEHICLE

(71) Applicant: BYD COMPANY LIMITED, Shenzhen (CN)

(72) Inventors: Li Zhan, Shenzhen (CN); Yanfei Zhou, Shenzhen (CN); Zhonglin Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/921,384

(22) Filed: Mar. 14, 2018

(65) Prior Publication Data

US 2018/0205060 A1    Jul. 19, 2018

Related U.S. Application Data

(63) Continuation of application No. PCT/CN2015/091265, filed on Sep. 30, 2015.

(51) Int. Cl.
| | |
|---|---|
| *H01R 24/00* | (2011.01) |
| *H01M 2/20* | (2006.01) |
| *H01R 11/09* | (2006.01) |
| *H01R 11/28* | (2006.01) |
| *H01R 13/24* | (2006.01) |

(52) U.S. Cl.
CPC ............ *H01M 2/206* (2013.01); *H01R 11/09* (2013.01); *H01M 2220/20* (2013.01); *H01R 11/288* (2013.01); *H01R 13/24* (2013.01)

(58) Field of Classification Search
CPC .............................. Y02E 60/12; H01R 11/281
USPC ......... 439/627, 765; 429/158, 160, 163, 178
See application file for complete search history.

(56) References Cited

U.S. PATENT DOCUMENTS

| | | | |
|---|---|---|---|
| 5,143,804 A | 9/1992 | McArthur et al. | |
| 5,578,392 A * | 11/1996 | Kawamura | H01M 2/105 429/123 |
| 7,270,576 B2 * | 9/2007 | Kim | H01M 2/206 429/158 |

(Continued)

FOREIGN PATENT DOCUMENTS

| | | |
|---|---|---|
| CN | 1976095 A | 6/2007 |
| DE | 102010019708 A1 | 11/2011 |

(Continued)

*Primary Examiner* — Thanh Tam T Le

(57) ABSTRACT

A connector for connecting power batteries, a power battery module, a power battery pack and a vehicle are provided. The connector includes a main connection sheet, a first fixing sheet and a second fixing sheet, in which the main connection sheet includes first and second connection segments in a longitudinal direction, the second connection segment is bent over to be located above the first connection segment, the first fixing sheet is connected to an edge of the first connection segment and a first predetermined angle is formed between the first fixing sheet and the first connection segment, the second fixing sheet is connected to an edge of the second connection segment and a second predetermined angle is formed between the second fixing sheet and the second connection segment, each of the first and second predetermined angles is larger than 0 degree and less than 180 degrees.

19 Claims, 2 Drawing Sheets

(56) References Cited

U.S. PATENT DOCUMENTS

| | | | | |
|---|---|---|---|---|
| 7,294,020 B2* | 11/2007 | Zhao | ...................... | H01R 11/28 |
| | | | | 439/627 |
| 7,410,726 B2* | 8/2008 | Kishiyama | ............ | H01M 2/021 |
| | | | | 29/623.2 |
| 7,736,796 B2* | 6/2010 | Nagatani | ............... | H01M 2/204 |
| | | | | 429/158 |
| 8,114,540 B2* | 2/2012 | Trester | ................. | H01M 10/48 |
| | | | | 174/68.2 |
| 8,501,340 B2* | 8/2013 | Kim | ..................... | H01M 2/202 |
| | | | | 429/121 |
| 8,574,008 B2* | 11/2013 | Grobetae | ............. | H01M 2/202 |
| | | | | 439/627 |
| 8,603,664 B2* | 12/2013 | Ishizu | .................. | H01M 2/206 |
| | | | | 429/158 |
| 8,795,874 B2* | 8/2014 | Bae | .................... | B23K 11/0033 |
| | | | | 429/158 |
| 8,962,172 B2* | 2/2015 | Bolze | ................. | H01M 2/1072 |
| | | | | 429/120 |
| 8,999,551 B2* | 4/2015 | Lietz | .................... | H01M 2/202 |
| | | | | 429/121 |
| 9,590,223 B2* | 3/2017 | Zhang | ................. | H01R 13/533 |
| 2007/0141458 A1 | 6/2007 | Nagatani et al. | | |
| 2009/0274956 A1 | 11/2009 | Kosugi et al. | | |
| 2010/0190050 A1 | 7/2010 | Ochi | | |
| 2012/0100761 A1 | 4/2012 | Grose et al. | | |
| 2014/0017553 A1 | 1/2014 | Kikuchi et al. | | |
| 2014/0127918 A1 | 5/2014 | Huo | | |

FOREIGN PATENT DOCUMENTS

| | | |
|---|---|---|
| DE | 102012204591 A1 | 9/2013 |
| JP | 2010123648 A | 6/2010 |

* cited by examiner

CONNECTOR FOR POWER BATTERIES, POWER BATTERY MODULE, POWER BATTERY PACK AND VEHICLE

CROSS REFERENCE TO RELATED APPLICATION

This application is a continuation application of PCT Patent Application No. PCT/CN2015/091265, entitled "CONNECTOR FOR POWER BATTERIES, POWER BATTERY MODULE, POWER BATTERY PACK AND VEHICLE" filed on Sep. 30, 2015, the entire contents of which are incorporated herein by reference in their entirety.

TECHNICAL FIELD

Embodiments of the present disclosure generally relate to a field of power batteries, and more particularly, to a connector for connecting power batteries, a power battery module, a power battery pack and a vehicle.

BACKGROUND

Power battery modules in a power battery pack are commonly connected to each other via copper or aluminum braided wires, lamination guide plates, flat connection sheets or arch connection sheets. Although the braided wire has flexibility, an end of the braided wire needs to be pressed into a connection end, thus resulting in a large contact resistance of the connection end. Moreover, in a complex operation condition with frequent vibrations, the braided wire has low reliability and occupies a large space in a length direction. The lamination guide plate includes more than ten or even tens of layers of copper foils or aluminum foils, and the more than ten or even tens of layers of copper foils or aluminum foils are pressed together at two ends of the lamination guide plate. Due to a larger number of the layers of copper foils or aluminum foils, contact resistances of the two ends of the lamination guide plate are large and the lamination guide plate generally is suitable for a one-dimensional flexible deformation, but not for a three-dimensional flexible deformation. In addition, the lamination guide plate has a complex manufacturing process and a high cost. The flat or arch connection sheet has poor flexibility and vibration resistance, and is easy to be broken because of fatigue.

SUMMARY

Embodiments of the present disclosure seek to solve at least one of the problems existing in the related art to at least some extent.

Accordingly, embodiments of the present disclosure provide a connector for connecting power batteries, which has a simple configuration and a high reliability, occupies small space and is convenient to be connected and manufactured.

Embodiments of the present disclosure further provide a power battery module including the above connector for connecting power batteries.

Embodiments of the present disclosure further provide a power battery pack including the above connector for connecting power batteries.

Embodiments of the present disclosure further provide a vehicle including the power battery pack.

Embodiments of a first aspect of the present disclosure provided a connector for connecting power batteries, including a main connection sheet, a first fixing sheet configured to be connected to a first power battery, and a second fixing sheet configured to be connected to a second power battery, in which the main connection sheet is divided into a first connection segment and a second connection segment in a longitudinal direction, the second connection segment is bent over to be located above the first connection segment, the first fixing sheet is connected to an edge of the first connection segment and a first predetermined angle is formed between the first fixing sheet and the first connection segment, the second fixing sheet is connected to an edge of the second connection segment and a second predetermined angle is formed between the second fixing sheet and the second connection segment, the first predetermined angle is larger than 0 degree and less than 180 degrees, and the second predetermined angle is larger than 0 degree and less than 180 degrees.

With the connector for connecting power batteries according to embodiments of the present disclosure, the main connection sheet is divided into the first connection segment and the second connection segment, and the second connection segment is bent over to be located above the first connection segment. Moreover, an included angle between the first fixing sheet and the first connection segment is larger than 0 degree and less than 180 degrees, and an included angle between the second fixing sheet and the second connection segment is larger than 0 degree and less than 180 degrees, so that the connector includes bends in at least three directions, i.e., the connector has flexibility in at least three directions, thus greatly improving vibration-resistant reliability of the connector. The connector has a simple structure and a low cost, occupies small space and is convenient to be manufactured. Furthermore, a braided wire structure is replaced with the connector, and it does not need to press wires at a connection point, thus reducing a contact resistance thereof.

Embodiments of a second aspect of the present disclosure provide a power battery module, including a plurality of power batteries, in which adjacent power batteries are connected to one another via a connecter for power batteries according to above embodiments of the present disclosure.

Embodiments of a third aspect of the present disclosure provide power battery pack, including a plurality of power battery modules, in which adjacent power battery modules are connected to one another via a connecter for power batteries according to above embodiments of the present disclosure.

Embodiments of a fourth aspect of the present disclosure provide a vehicle, including a power battery pack according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

Figure 1:
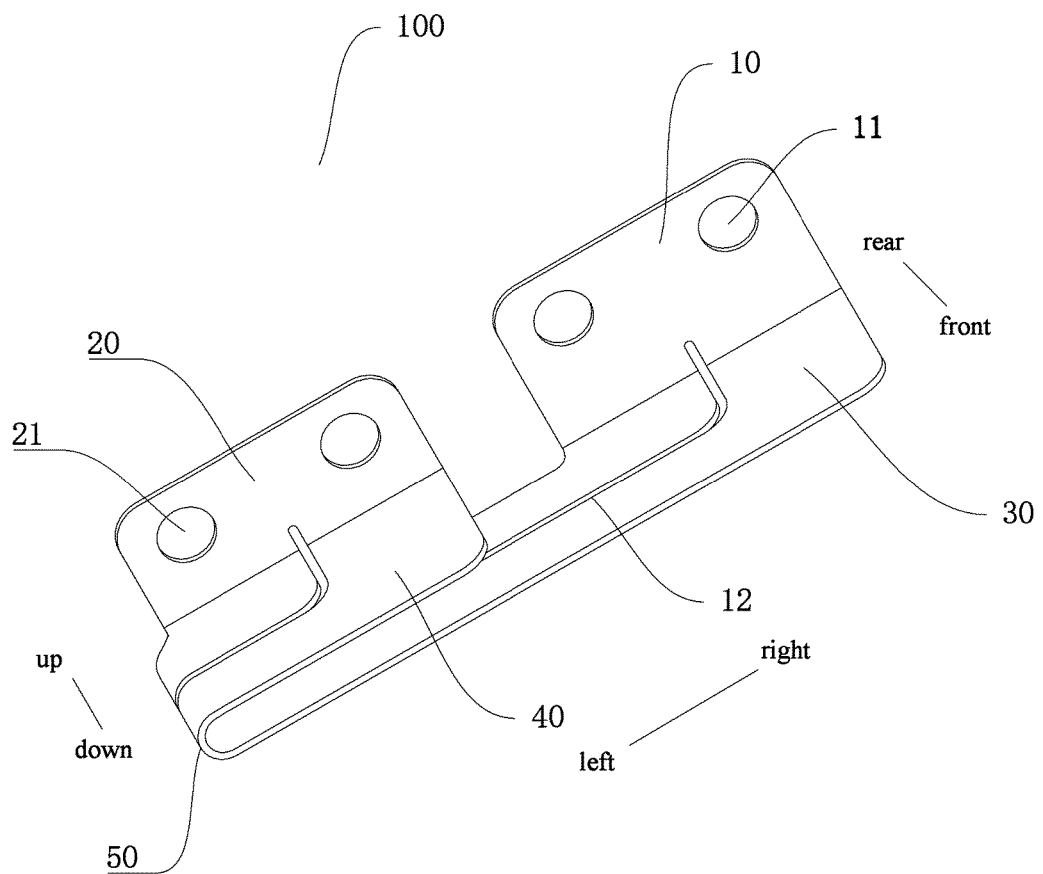
FIG. 1 is a schematic view of a connector according to an embodiment of the present disclosure.

REFERENCE NUMERALS connector 100;
first fixing sheet 10; first connection hole 11; groove 12;
second fixing sheet 20; second connection hole 21;
first connection segment 30;
second connection segment 40; bent portion 50.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A connector 100 for power batteries according to embodiments of the present disclosure will be described in the following with reference to drawings.

As shown in FIGS. 1-4, the connector 100 according to embodiments of the present disclosure includes a main connection sheet, a first fixing sheet 10 configured to be connected to a first power battery and a second fixing sheet 20 configured to be connected to a second power battery. The main connection sheet is divided into a first connection segment 30 and a second connection segment 40. The second connection segment 40 is bent over to be located above the first connection segment 30. The first fixing sheet 10 is connected to an edge of the first connection segment 30 and a first predetermined angle is formed between the first fixing sheet 10 and the first connection segment 30. The second fixing sheet 20 is connected to an edge of the second connection segment 40 and a second predetermined angle is formed between the second fixing sheet 20 and the second connection segment 40. The first predetermined angle is larger than 0 degree and less than 180 degrees and the second predetermined angle is larger than 0 degree and less than 180 degrees.

In other words, the connector 100 according to embodiments of the present disclosure mainly includes the main connection sheet, the first fixing sheet 10 and the second fixing sheet 20. In embodiments of the present disclosure, the connector 100 generally is used to connect two power batteries which may be referred as the first power battery and the second power battery. The first fixing sheet 10 is connected to the first power battery, and the second fixing sheet 20 is connected second power battery.

The main connection sheet includes the first connection segment 30 and the second connection segment 40. The first connection segment 30 and the second connection segment 40 extend in a length direction of the main connection sheet, i.e., in a left and right direction as shown in FIG. 1. Each of the first connection segment 30 and the second connection segment 40 may be configured a segment having a long-strip shape extending in the left and right direction as shown in FIG. 1. A first end of the first connection segment 30 is connected to an end of the second connection segment 40 via a bent portion 50, and a second end of the first connection segment 30 is located above the second connection segment 40 by the bent portion 50.

The first fixing sheet 10 is disposed at the first connection segment 30 and is connected to the side edge of the first connection segment 30, an angle formed between the first fixing sheet 10 and the first connection segment 30 is the first predetermined angle, and the first predetermined angle is larger than 0 degree and less than 180 degrees. The second fixing sheet 20 is disposed at the second connection segment 40 and connected to the side edge of the second connection segment 40, an angle formed between the second fixing sheet 20 and the second connection segment 40 is the second predetermined angle, and the second predetermined angle is larger than 0 degree and less than 180 degrees.

With the connector 100 for power batteries according to embodiments of the present disclosure, the main connection sheet is divided into the first connection segment 30 and the second connection segment 40, and the second connection segment 40 is bent over to be located above the first connection segment 30. Moreover, an included angle between the first fixing sheet 10 and the first connection segment 30 is larger than 0 degree and less than 180 degrees, and an included angle between the second fixing sheet 20 and the second connection segment 40 is larger than 0 degree and less than 180 degrees, so that the connector 100 includes bends in at least three directions, i.e., the connector has flexibility in at least three directions, thus greatly improving vibration-resistant reliability of the connector 100. The connector 100 has a simple structure and a low cost, occupies small space and is convenient to be manufactured. Furthermore, a braided wire structure is replaced with the connector 100, and it does not need to press wires at a connection point, thus reducing a contact resistance thereof.

According to an embodiment of the present disclosure, the first connection segment 30 and the second connection segment 40 are parallel with each other. In some embodiments, a bent portion 50 between the first connection segment 30 and the second connection segment 40 is configured to have a U shape, and a bottom wall of the U shape is configured as an arc wall or a flat wall connected to a side wall of the U shape via a circular arc transition.

Specifically, as shown in FIGS. 1 to 4, each of the first connection segment 30 and the second connection segment 40 is configured as a sheet extending in a horizontal direction, i.e., the left and right direction in FIG. 1. The bent portion 50 between the first connection segment 30 and the second connection segment 40 is configured to have a substantial U shape, and two side walls of the U shape are parallel with each other. The first connection segment 30 and the second connection segment 40 are connected to the two side walls of the U shape and extend in an extending direction of the side walls, respectively.

Figure 2:
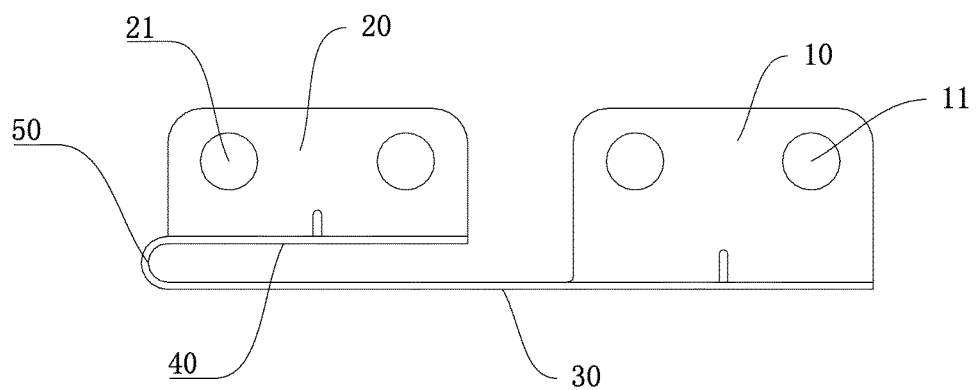
FIG. 2 is a schematic view of a connector from another perspective according to an embodiment of the present disclosure.
Figure 3:
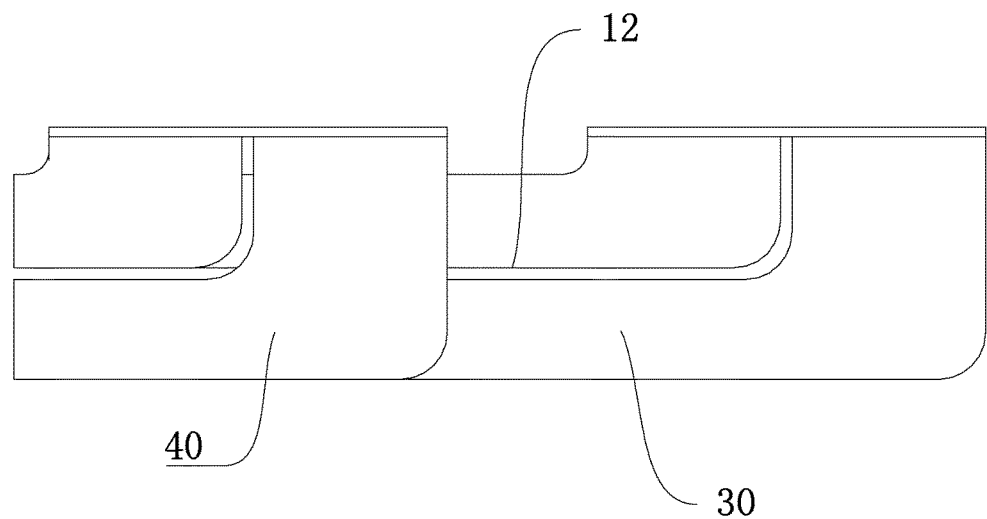
FIG. 3 is a schematic view of a connector from another perspective according to an embodiment of the present disclosure.
Figure 4:
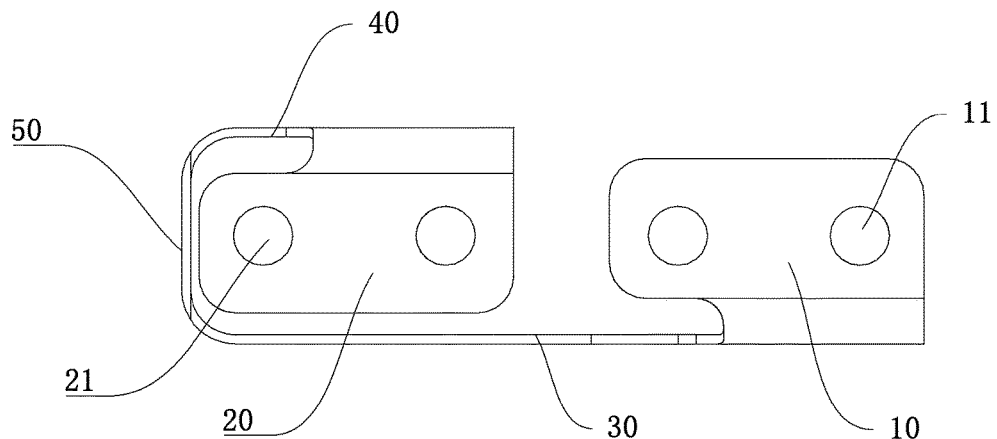
FIG. 4 is a schematic view of a connector according to another embodiment of the present disclosure.

The bent portion 50 having the U shape further includes the bottom wall connected to the two side walls, apart from the two side walls parallel with other. The bottom wall may be configured as the flat wall, i.e., a plane in which the bottom wall is a flat plane (that is, the bottom wall has a flat surface as shown in FIG. 4). The bottom wall also may be configured as the arc wall, i.e., the plane in which the bottom wall is an arc plane (that is, the bottom wall has an arc surface as shown in FIGS. 1 to 3). The bottom wall is connected to each of the two side walls via the circular arc transition, thus further improving a buffering effect and ensuring the vibration-resistant reliability.

In some embodiments of the present disclosure, each of the first predetermined angle and the second predetermined angle is 90 degrees. That is, the first fixing sheet 10 is perpendicularly connected to the side edge of the first connection segment 30, and the second fixing sheet 20 is perpendicularly connected to the side edge of the second connection segment 40. When the first connection segment 30 is parallel with the second connection segment 40, the first fixing sheet 10 is parallel with the second fixing sheet 20. Thus, with a configuration in which the first connection segment 30 is parallel with the second connection segment 40 and the first fixing sheet 10 is parallel with the second fixing sheet 20, the connector 100 has a reasonable structure and better vibration-resistant performance.

According to an embodiment of the present disclosure, the first fixing sheet 10 and the second fixing sheet 20 are at a same side of the main connection sheet. In some embodiments, the first fixing sheet 10 and the second fixing sheet 20 are coplanar.

As shown in FIG. 1, in embodiments of the present disclosure, the first fixing sheet 10 and the second fixing sheet 20 are at rear sides of the first connection segment 30 and the second connection segment 40, and perpendicularly connected to rear side edges of the first connection segment 30 and the second connection segment 40 respectively, and the first fixing sheet 10 and the second fixing sheet 20 are in a same plane.

In other embodiments of the present disclosure, the first fixing sheet 10 and the second fixing sheet 20 extend from the main connection sheet in a same direction or in opposite directions.

In other words, in an embodiment of the present disclosure, as shown in FIG. 4, the first fixing sheet 10 extends upwards from an upper surface of the first connection segment 30, the second connection segment 40 is located above the first connection segment 30, and the second fixing sheet 20 extends downwards from a lower surface of the second connection segment 40. In an embodiment of the present disclosure as shown in FIGS. 1 to 3, the first fixing sheet 10 extends upwards from the upper surface of the first connection segment 30, the second connection segment 40 is located above the first connection segment 30, and the second fixing sheet 20 extends from an upper surface of the second connection segment 40.

According to an embodiment of the present disclosure, the first fixing sheet 10 is adjacent a free end of the first connection segment 30, and the second fixing sheet 20 is adjacent to a free end of the second connection segment 40. Furthermore, an edge of the first fixing sheet 10 adjacent to the free end of the first connection segment 30 is in flush with an end surface of the free end of the first connection segment 30, and an edge of the second fixing sheet 20 adjacent to the free end of the second connection segment 40 is in flush with an end surface of the free end of the second connection segment 40.

Specifically, as shown in FIG. 1, the first fixing sheet 10 is disposed at a right end of the first connection segment 30, and the second fixing sheet 20 is disposed at a right end of the second connection segment 40. A side edge of a right end of the first fixing sheet 10 is in flush with an edge of the right end of the first connection segment 30, and an edge of a right end of the second fixing sheet 20 is in flush with an edge of the right end of the second connection segment 40. Thus, the connector 100 has a flatter structure.

In some embodiments of the present disclosure, the free end of the second connection sheet 40 is located above a middle portion of the first connection segment 30. Preferably, the free end of the second connection segment 40 is spaced away from a side of the first fixing sheet 10 away from the free end of the first connection segment 30.

In other words, as shown in FIG. 3, in the embodiment of the present disclosure, the right end of the second connection segment 40 extends rightwards to a position adjacent to the middle portion of the first connection segment 30, and the right end of the second connection segment 40 is arranged and spaced away from a left end of the first fixing sheet 10 disposed at the first connection segment 30. Thus, it is more convenient to assemble the connector 100 on a basis of ensuring the vibration-resistant performance thereof.

According to an embodiment of the present disclosure, the connector 100 is integrally formed by bending a single mental sheet, i.e., the first fixing sheet 10, the second fixing sheet 20, the first connection segment 30 and the second connection segment 40 are integrally formed as the metal sheet. Furthermore, the main connection sheet, the first fixing sheet 10 and the second fixing sheet 20 may be integrally formed as a copper sheet or an aluminum sheet. That is, the connector 100 may be the copper sheet or the aluminum sheet, or another metal sheet commonly used in the related art.

Thus, the integrally formed connector 10 ensures the stability of the whole structure, and is convenient to be molded, thus further reducing the manufacturing cost. In addition, the connector 10 does not have a contact resistance due to the integrally formed structure thereof.

In some embodiments, each of the first fixing sheet 10 and the second fixing sheet 20 is connected to the main connection sheet via an arc bend. In other words, the first fixing sheet 10 is connected to the first connection segment 30 via a first arc bend, and the second fixing sheet 20 is connected to the second connection segment 40 via a second arc bend. Thus, the vibration-resistant reliability of the connector 100 is further improved.

According to an embodiment of the present disclosure, the main connection sheet has a groove 12 penetrated therethrough in a thickness thereof. Moreover, the groove 12 extends into the first fixing sheet 10 and the second fixing sheet 20. Furthermore, a plurality of grooves 12 is provided and parallel with each other.

In other words, in embodiments of the present disclosure, the groove 12 is formed in each of the first connection segment 30 and the second connection segment 40 of the main connection sheet, and the grooves 12 in the first connection segment 30 and the second connection segment 40 communicates with each other. In some embodiments, the grooves 12 may further extend into the first fixing sheet 10 and the second fixing sheet 20, and extend in the first fixing sheet 10 and the second fixing sheet 20 by a predetermined length respectively, in which the predetermined length may be adjusted reasonably according to actual requirements. For example, the predetermined length may be ⅒ to ¼ of a length of the first fixing sheet 10 or the second fixing sheet 20.

One or more grooves 12 may be provided in the main connection sheet. Preferably, the plurality of grooves 12 is provided and parallel with each other.

Thus, by providing the grooves 12 extending in extending directions of parts of the connector 100, the buffering performance of the connector 100 is further improved and the vibration-resistant reliability is ensured.

In some embodiments of the present disclosure, the first fixing sheet 10 has a first connection hole 11, and the second fixing sheet 20 has a second connection hole 21. Furthermore, two first connection holes 11 are provided in the first fixing sheet 10, and arranged and spaced away from each other in a longitudinal direction of the main connection sheet, and two second connection holes 12 are provided in the second fixing sheet 20, and arranged and spaced away from each other in the longitudinal direction of the main connection sheet.

The first fixing sheet 10 may be connected to the first power battery via the first connection hole 11, and the second fixing sheet 20 may be connected to the second power battery via the second connection hole 21. The two first connection holes 11 are spaced away from each other in the longitudinal direction of the main connection sheet, and the two second connection hole 21 are spaced away from each other in the longitudinal direction of the main connection sheet, and thus it is more convenient for the connector 100 to be connected to the power battery, and the connector 10 has better stability and vibration-resistant performance.

According to an embodiment of the present disclosure, a metal coating is disposed on the connector 100, i.e., the metal coating is disposed on each of the main connection sheet, the first fixing sheet 10 and the second fixing sheet 20. In some embodiments, the metal coating may be an electrodeposited coating or a chemical coating. Therefore, by disposing the metal coating on the connector 100, the oxidation-resistant performance of the connector 100 is improved significantly, thus lengthening a working life of the connector 100.

In some embodiments of the present disclosure, each of the first connection segment 30, the second connection segment 40, the first fixing sheet 10 and the second fixing sheet 20 has a rectangle shape. In some embodiments, each corner of each of the first connection segment 30, the second connection segment 40, the first fixing sheet 10 and the second fixing sheet 20 is rounded off.

Thus, the sheet having the rectangle shape has relatively high structure stability and higher vibration-resistant performance. Each corner of the sheet is rounded off, i.e., each corner of an outline of the connector 100 is configured as a rounded corner, thus avoiding damages on a person by a pointedness at a connection point and an external pointedness.

A power battery module according to embodiments of the present disclosure includes a plurality of power batteries, and adjacent power batteries are connected to one another via the connecter 100 for power batteries according to above embodiments of the present disclosure. Adjacent two power batteries may be arranged in a longitudinal direction or in a lateral direction, and the connectors 100 in different above embodiments may be used in different arrangements of the power batteries.

A power battery pack according to embodiments of the present disclosure includes a plurality of power battery modules, and adjacent power battery modules are connected to one another via the connecter 100 for power batteries according to above embodiments of the present disclosure. Adjacent two power battery modules may be arranged in a longitudinal direction or in a lateral direction, and the connectors 100 in different above embodiments may be used in different arrangements of the power battery modules.

Since the connector 100 for power batteries according to above embodiments of the present disclosure has above technical effects, each of the power battery module and the power battery pack according to embodiments of the present disclosure has corresponding technical effects, i.e., each of the power battery module and the power battery pack according to embodiments of the present disclosure has a simple structure and a high vibration-resistant performance, and is easy to be assembled.

A vehicle according to embodiments of the present disclosure includes the power battery pack according to above embodiments of the present disclosure. Since the connector 100 for power batteries according to above embodiments of the present disclosure has above technical effects, the vehicle according to embodiments of the present disclosure has corresponding technical effects, i.e., the vehicle according to embodiments of the present disclosure has a simple structure and a high vibration-resistant performance, and is easy to be assembled.

Other configurations and operations of the vehicle according to the embodiments of the present disclosure are known by those skilled in the related art, which are omitted herein.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A connector for connecting power batteries, comprising:
a main connection sheet, a first fixing sheet configured to be connected to a first power battery, and a second fixing sheet configured to be connected to a second power battery, wherein the main connection sheet is divided into a first connection segment and a second connection segment in a longitudinal direction, the second connection segment is bent over to be located above the first connection segment, the first fixing sheet is connected to an edge of the first connection segment and a first predetermined angle is formed between the first fixing sheet and the first connection segment, the second fixing sheet is connected to an edge of the second connection segment and a second predetermined angle is formed between the second fixing sheet and the second connection segment, the first predetermined angle is larger than 0 degree and less than 180 degrees, the second predetermined angle is larger than 0 degree and less than 180 degrees, and the first fixing sheet and the second fixing sheet are at a same side of the main connection sheet.

2. The connector for connecting power batteries according to claim 1, wherein the first connection segment is parallel with the second connection segment.

3. The connector for connecting power batteries according to claim 1, wherein a bent portion between the first connection segment and the second connection segment is configured to has a U shape, and a bottom wall of the U shape is configured as an arc wall or a flat wall connected to a side wall of the U shape via a circular arc transition.

4. The connector for connecting power batteries according to claim 3, wherein each of the first predetermined angle and the second predetermined angle is 90 degrees.

5. The connector for connecting power batteries according to claim 1, wherein the first fixing sheet and the second fixing sheet are coplanar.

6. The connector for connecting power batteries according to claim 1, wherein the first fixing sheet and the second fixing sheet extend from the main connection sheet in a same direction or in opposite directions.

7. The connector for connecting power batteries according to claim 1, wherein the first fixing sheet is adjacent to a free end of the first connection segment, and the second fixing sheet is adjacent to a free end of the second connection segment.

8. The connector for connecting power batteries according to claim 7, wherein an edge of the first fixing sheet adjacent to the free end of the first connection segment is in flush with an end surface of the free end of the first connection segment, and an edge of the second fixing sheet adjacent to the free end of the second connection segment is in flush with an end surface of the free end of the second connection segment.

9. The connector for connecting power batteries according to claim 1, wherein a free end of the second connection segment is located above a middle portion of the first connection segment.

10. The connector for connecting power batteries according to claim 1, wherein a free end of the second connection segment is spaced away from a side of the first fixing sheet, and is away from the free end of the first connection segment.

11. The connector for connecting power batteries according to claim 1, wherein the connector is integrally formed by bending a single mental sheet.

12. The connector for connecting power batteries according to claim 1, wherein each of the first fixing sheet and the second fixing sheet is connected to the main connection sheet via an arc bend.

13. The connector for connecting power batteries according to claim 1, wherein the main connection sheet defines a groove penetrated therethrough in a thickness thereof.

14. The connector for connecting power batteries according to claim 13, wherein the groove extends into the first fixing sheet and the second fixing sheet.

15. The connector for connecting power batteries according to claim 13, wherein a plurality of grooves is provided and parallel with each other.

16. The connector for connecting power batteries according to claim 1, wherein the first fixing sheet defines a first connection hole and the second fixing sheet defines a second connection hole.

17. The connector for connecting power batteries according to claim 16, wherein two first connection holes are provided, and arranged and spaced away from each other in a longitudinal direction of the main connection sheet, and two second connection holes are provided, and arranged and spaced away from each other in the longitudinal direction of the main connection sheet.

18. The connector for connecting power batteries according to claim 1, wherein the main connection sheet, the first fixing sheet and the second fixing sheet are made of copper or aluminum.

19. The connector for connecting power batteries according to claim 1, wherein a metal coating is disposed on the main connection sheet, the first fixing sheet and the second fixing sheet.

* * * * *